US010430370B2

(12) United States Patent
Watanabe

(10) Patent No.: US 10,430,370 B2
(45) Date of Patent: Oct. 1, 2019

(54) DATA TRANSFER DEVICE, DATA TRANSFER METHOD, AND A NON-TRANSITORY RECORDING MEDIUM

(71) Applicant: Yuuto Watanabe, Kanagawa (JP)

(72) Inventor: Yuuto Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/018,786

(22) Filed: Jun. 26, 2018

(65) Prior Publication Data

US 2019/0012290 A1 Jan. 10, 2019

(30) Foreign Application Priority Data

Jul. 4, 2017 (JP) ................................. 2017-131461

(51) Int. Cl.
| G06F 13/42 | (2006.01) |
| G06F 13/38 | (2006.01) |
| G06F 13/18 | (2006.01) |
| G06F 13/16 | (2006.01) |

(52) U.S. Cl.
CPC ...... *G06F 13/4282* (2013.01); *G06F 13/1668* (2013.01); *G06F 13/18* (2013.01); *G06F 13/385* (2013.01); *G06F 2213/0026* (2013.01)

(58) Field of Classification Search
None
See application file for complete search history.

(56) References Cited

U.S. PATENT DOCUMENTS

| 5,425,101 A * | 6/1995 | Woo ................. H04B 7/18578 370/409 |
| 6,012,142 A * | 1/2000 | Dokic ................. G06F 9/4405 713/2 |
| 7,660,917 B2 * | 2/2010 | Freking ............... G06F 13/4031 710/29 |
| 2006/0013135 A1 * | 1/2006 | Schmidt ................ H04L 47/10 370/235 |
| 2007/0211746 A1 | 9/2007 | Oshikiri et al. |
| 2008/0049762 A1 * | 2/2008 | Burchard ........... H04L 49/3045 370/397 |
| 2008/0080499 A1 * | 4/2008 | Chun ................... H04J 3/1617 370/389 |
| 2011/0310739 A1 * | 12/2011 | Aybay ................. H04L 47/10 370/235 |
| 2013/0250792 A1 * | 9/2013 | Yoshida .............. H04L 49/9036 370/252 |
| 2018/0253391 A1 * | 9/2018 | Lee ...................... G06F 13/1668 |

FOREIGN PATENT DOCUMENTS

| JP | 2007-241882 | 9/2007 |
| JP | 2007-272871 | 10/2007 |

* cited by examiner

*Primary Examiner* — Michael Sun
(74) *Attorney, Agent, or Firm* — Oblon, McClelland, Maier & Neustadt, L.L.P.

(57) ABSTRACT

A data transfer device includes circuitry to: set information regarding a virtual channel of a counterpart device to which data are to be transferred from the data transfer device, switch between a first communication process and a second communication process according to the information regarding the virtual channel of the counterpart device, the first communication process causing the circuitry to transmit or receive the data using a single virtual channel, and the second communication process causing the circuitry to transmit or receive the data using multiple virtual channels.

10 Claims, 17 Drawing Sheets

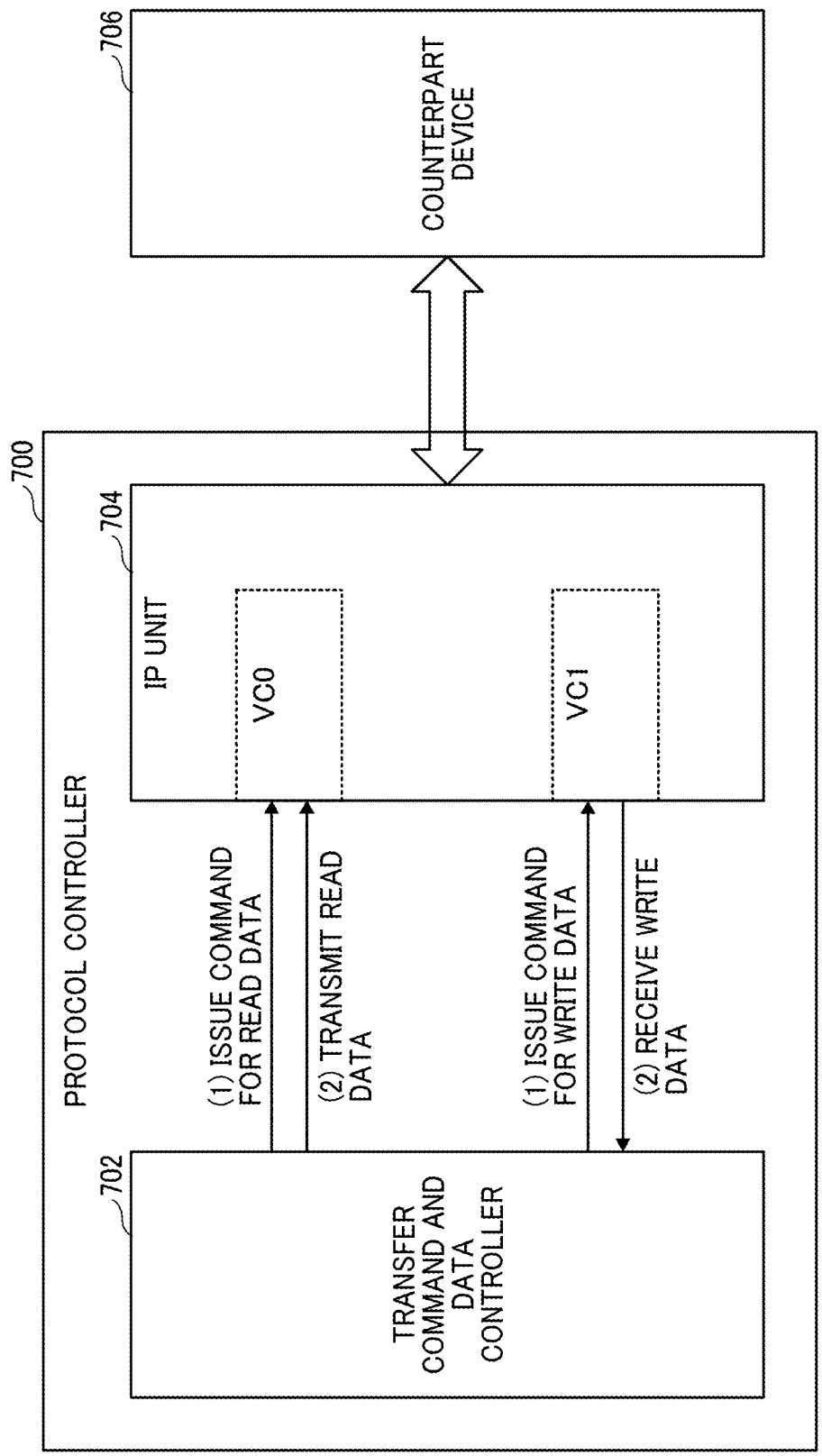

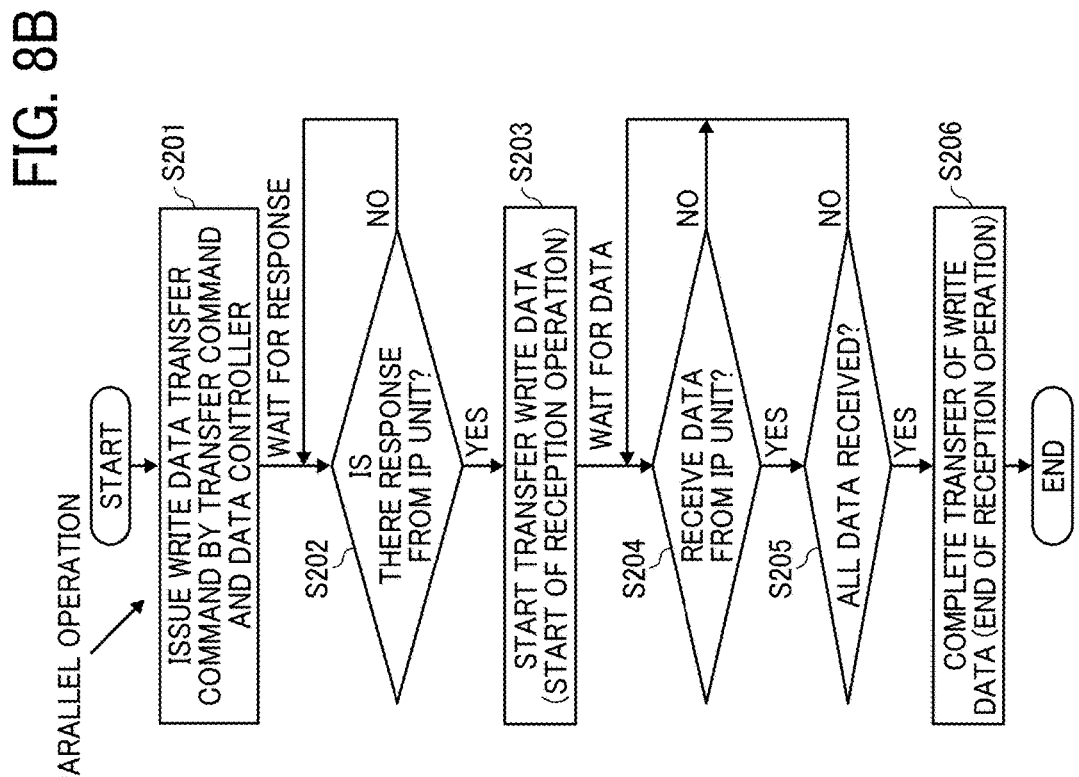
FIG. 8A / FIG. 8B
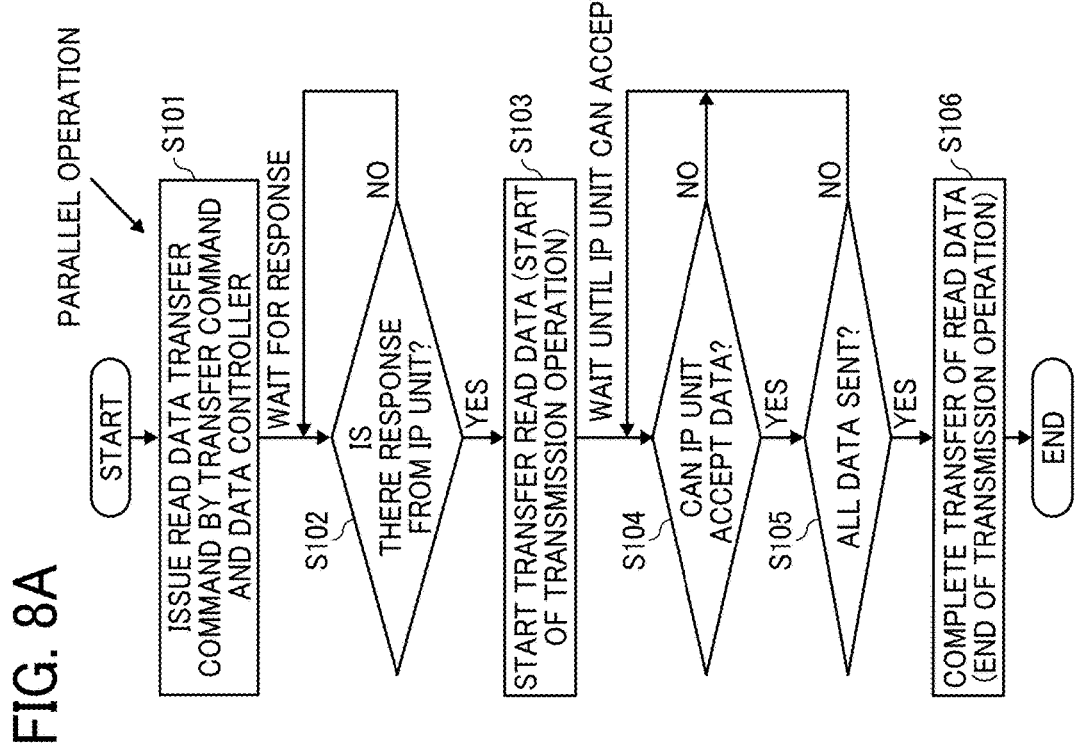

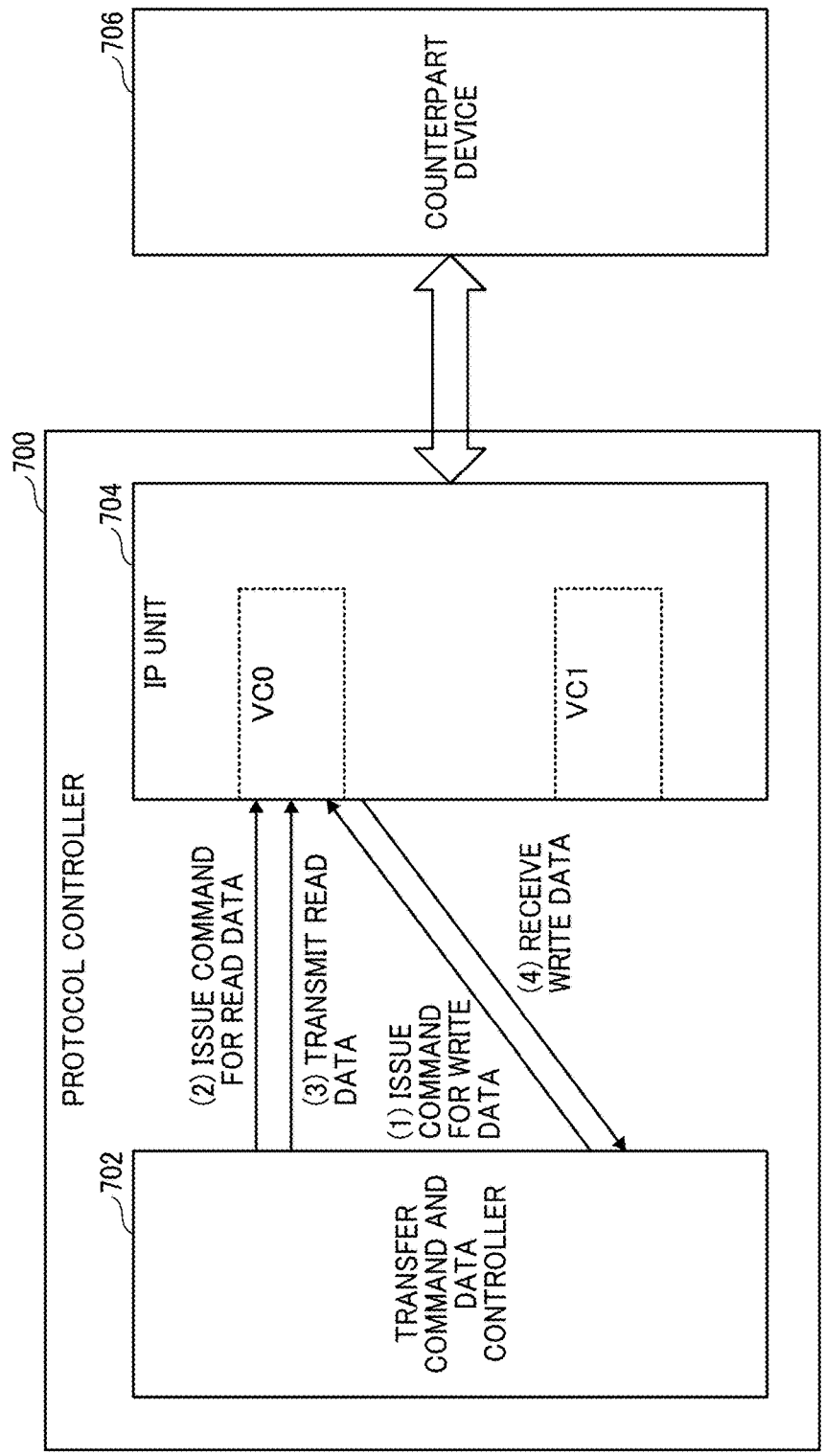

FIG. 11

| Little | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| | +3 | | | | | | | | +2 | | | | | | | | +1 | | | | | | | | +0 | | | | | | | |
| ADDRESS | RW | | | | | | | | vc_id (RO) | | | | | | | | vc_tc_map (RW) | | | | | | | | | | | | | | | |
| Initial | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | vc_enable

FIG. 14

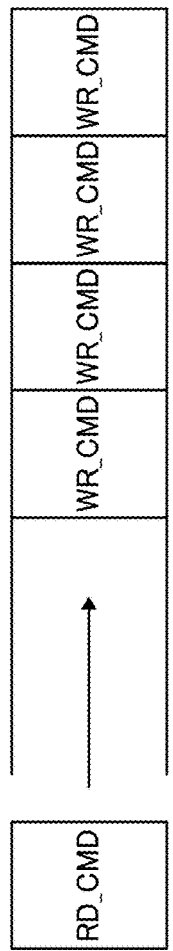

FIG. 17

DATA TRANSFER DEVICE, DATA TRANSFER METHOD, AND A NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2017-131461, filed on Jul. 4, 2017 in the Japan Patent Office, the entire disclosure of each of which is hereby incorporated by reference herein.

BACKGROUND

Technical Field

Aspects of the present disclosure relate to a data transfer device and a data transfer method, and a non-transitory recording medium storing program code for executing a data transfer method.

Related Art

A high-speed serial interface is often used to improve image data transfer capability of image forming apparatuses. As a typical high-speed serial interface, there is Peripheral Component Interconnect Express, or PCI Express, which is a serial computer expansion bus standard. Data transfer in PCI Express is performed in packet units, and a mechanism that uses a plurality of data flow buffers sharing a common link called a virtual channel (VC) is used to control the packets. Each virtual channel has resources such as independent buffers and is controlled independently in the link. A traffic class (TC) is associated with the virtual channel and priority can be assigned to the virtual channels depending on the traffic class.

Depending on the standard, up to eight virtual channels can be used. Of the eight virtual channels, only a single virtual channel is required and the other channels are optional. VC0 and TC0 are fixedly associated as a specification of PCI Express. A technique is known that allocates different virtual channels for each traffic class to devices such as an LSI and establishes priorities for data transfer using a mechanism for associating VC with TC.

SUMMARY

In an aspect of this disclosure, a novel data transfer device includes circuitry to set information regarding a virtual channel of a counterpart device to which data are to be transferred from the data transfer device, switch between a first communication process and a second communication process according to the information regarding the virtual channel of the counterpart device, the first communication process causing the circuitry to transmit or receive the data using a single virtual channel, and the second communication process causing the circuitry to transmit or receive the data using multiple virtual channels.

In another aspect of this disclosure, a data transfer method for transferring data using a serial interface includes setting information regarding a virtual channel of a counterpart device to which data are to be transferred, switching between a first communication process and a second communication process according to the information regarding the virtual channel of the counterpart device, the first communication process causing the circuitry to transmit or receive the data using a single virtual channel, and the second communication process causing the circuitry to transmit or receive the data using multiple virtual channels.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 7 is a diagram illustrating an example of a configuration of PCI Express using two virtual channels (VC 2ch);

FIGS. 8A and 8B are flowcharts of an operation in a configuration using two virtual channels (VC 2ch);

FIG. 9 is a diagram illustrating an example of a configuration using a single virtual channel (VC 1ch);

FIG. 11 is a diagram illustrating an example of a register for setting the virtual channel according to the embodiment of the present disclosure;

FIG. 14 is a diagram illustrating an example of a register for setting a transfer priority setting unit according to the embodiment of the present disclosure;

FIG. 15 illustrates an example of a reception command buffer of a counterpart device in the embodiment of the present disclosure;

FIG. 16 is a diagram illustrating an example of a register for enabling or disabling a function of adjusting an interval of the write command WR_CMD in the embodiment of the present disclosure;

FIG. 17 illustrates an example of a register for designating an interval of the write command WR_CMD according to the embodiment of the present disclosure;

Figure 1:
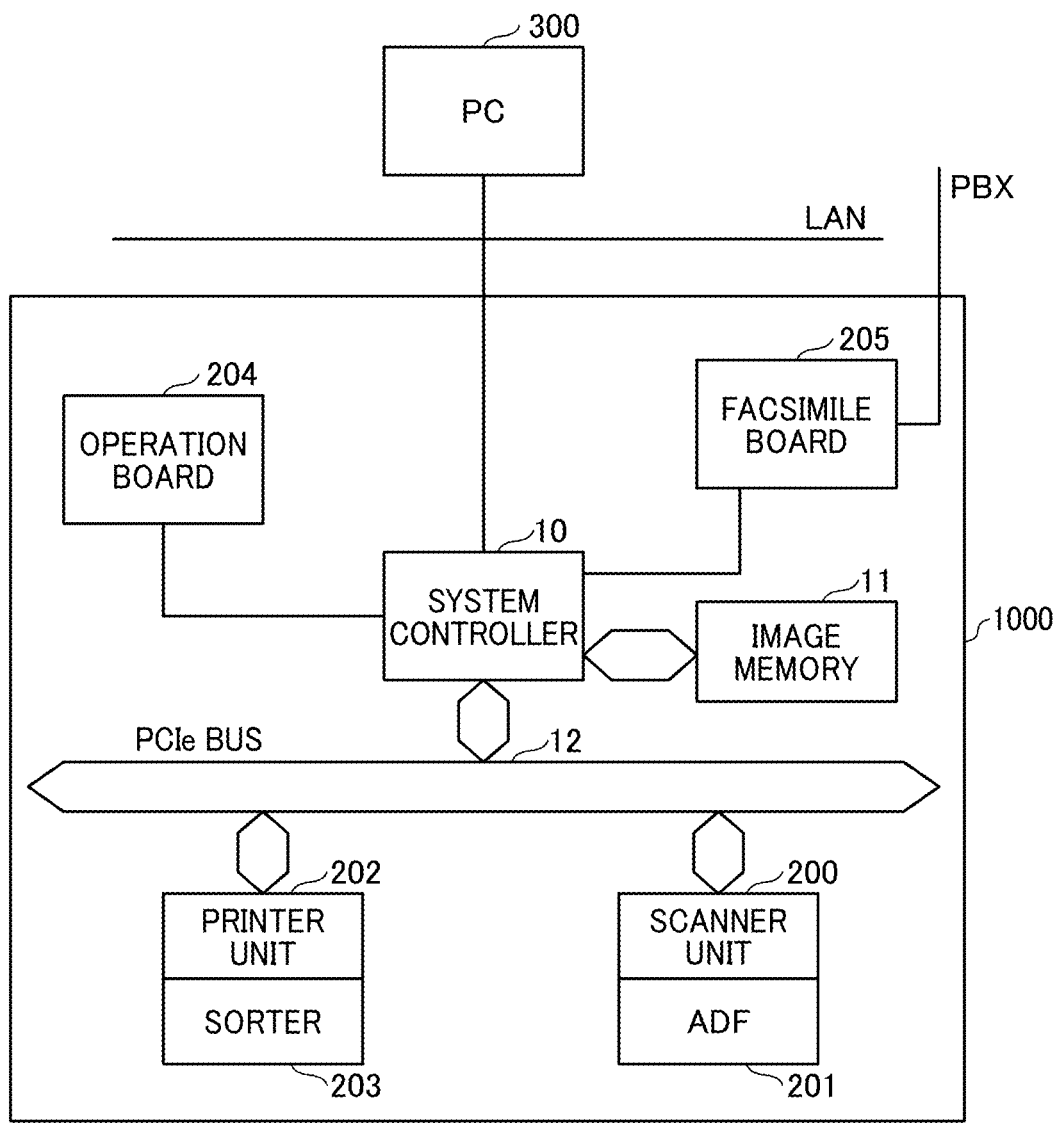
FIG. 1 is a block diagram illustrating an example of a system configuration of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in an analogous manner, and achieve similar results.

Although the embodiments are described with technical limitations with reference to the attached drawings, such description is not intended to limit the scope of the disclosure and all the components or elements described in the embodiments of this disclosure are not necessarily indispensable. As used herein, the singular forms "a", "an", and "the" are intended to include the plural forms as well, unless the context clearly indicates otherwise.

Embodiments of the present disclosure are described with reference to the accompanying drawings.

FIG. 1 is a block diagram illustrating an example of a system configuration of an image forming apparatus 1000 according to a first embodiment of the present disclosure. As illustrated in FIG. 1, the image forming apparatus 1000 includes a system controller 10, an image memory 11, a PCIe bus (Peripheral Component Interconnect Express Bus) 12, a scanner unit 200, an ADF (Auto Document Feeder) 201, a printer unit 202, a sorter 203, a control panel 204, and a facsimile board 205.

The system controller 10 controls the entire image forming apparatus 1000. The control panel 204 is connected to the system controller 10. The control panel 204 provides a display function, a functional setting function, and an information input function for an operator in addition to the controls related to a normal copy processing. The system controller 10 receives image data, a print instruction command, or the like from an external device such as a host PC (Personal Computer) 300 via a LAN (Local Area Network). The system controller 10 further controls printing of the image data received from the external device. Further, the system controller 10 includes a LAN controller, a parallel I/F (interface), and the like to receive image data and commands via the LAN and the parallel I/F for operation.

The facsimile board 205 drives the scanner unit 200 via the system controller to read an image for a document and transmits the image data to a facsimile communication line via PBX (Private Branch eXchange) when the facsimile board 205 receives an instruction of a facsimile transmission. Further, the facsimile board 205 can receive image data in response to a facsimile call from the communication line, drive the image forming apparatus 1000 via the system controller 10, and print out an image based on the received image data.

The scanner unit 200 and the printer unit 202 communicate with each other via the PCIe bus 12, which is a general-purpose bus. The scanner unit 200 corrects signal degradation due to an optical system and quantization of read image data into a digital signal by an internal image processing unit (IPU, Image Processing Unit). The scanner unit 200 transmits the image data to the printer unit 202 and writes the image data in the image memory 11 connected to the system controller 10.

When image data is stored in the image memory 11 and image processing is performed, the system controller 10 accesses the image memory 11, deploys print data of the host PC 300 (character code/character bit conversion), and performs image processing such as compression and decompression of image data and image correction for effective use of the memory.

In the flow of image data as described above, multiple functions of the image forming apparatus 1000 are implemented by a data transfer on the PCIe bus 12 by bus control executed by the system controller 10. The FAX transmission function as one of the multiple functions transfers the read image data of the scanner unit 200 to the facsimile board 205 via the PCIe bus 12. The system controller 10 allocates the right to use the PCIe bus 12 to the scanner unit 200, the printer unit 202, the image memory 11, and the facsimile board 205 for each job relating to image data processing by a function of the bus control.

The ADF 201 is an automatic document feeder and is a device for automatically feeding a document to the printer unit 202. The sorter 203 is a device that prints out multiple pages in multiple copies in which each copy is separately grouped.

Figure 2:
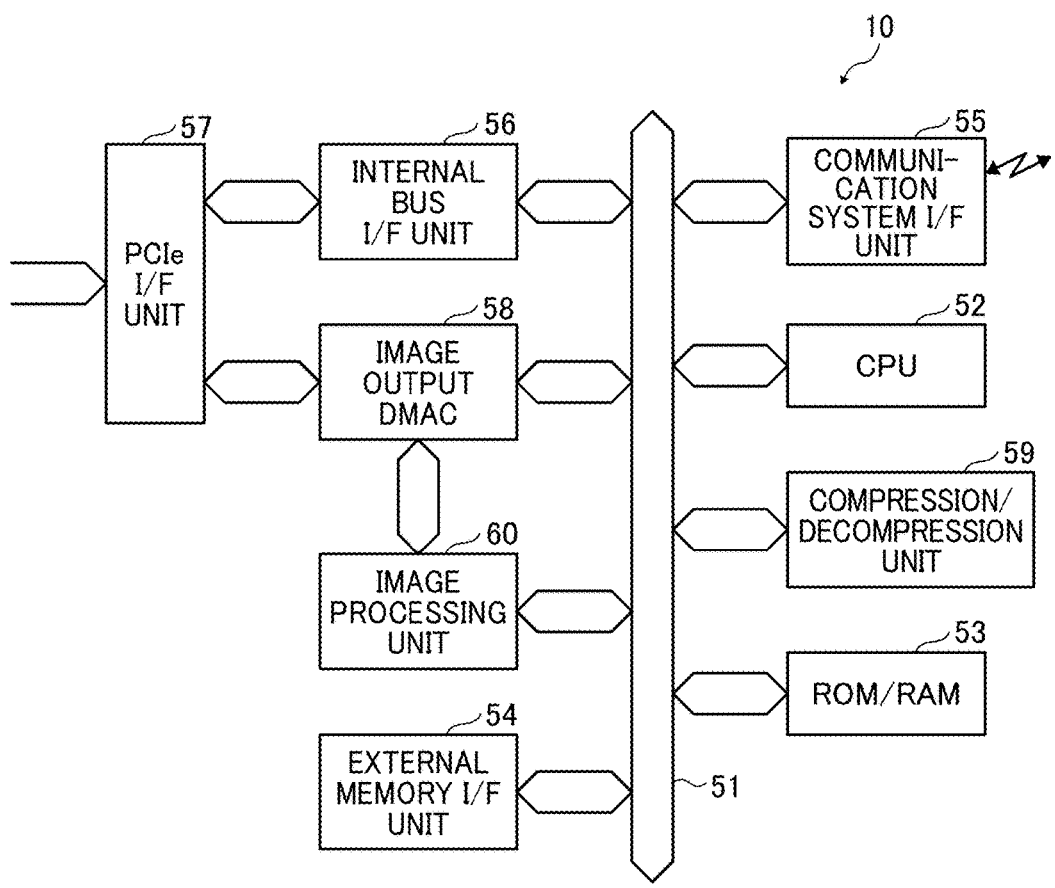
FIG. 2 is a block diagram illustrating an example of a configuration of a system controller according to the first embodiment of the present disclosure.

FIG. 2 is a block diagram illustrating an example of a configuration using the system controller 10 according to the first embodiment of the present disclosure. As illustrated in FIG. 2, the system controller 10 includes an internal bus 51, a CPU (Central Processing Unit) 52, a ROM (Read Only Memory)/RAM (Random Access Memory) 53, an external memory I/F unit 54, a communication system I/F unit 55, an internal bus I/F unit 56, a PCIe I/F unit 57, an image output DMAC (Direct Memory Access Controller) 58, a compression/decompression unit 59, and an image processing unit 60.

In the system controller 10, the CPU 52, the ROM/RAM 53, the external memory I/F unit 54, and the communication system I/F unit 55 are mutually connected via the internal bus 51. Further, the internal bus 51 connects the system controller 10 to the PCIe bus 12 via the internal bus I/F unit 56 and the PCIe I/F unit 57. Furthermore, the system controller 10 also includes the image output DMAC 58 and the image processing unit 60 built in the system controller 10. The image output DMAC 58 is connected to the PCIe I/F unit 57 in addition to the internal bus 51. The image output DMAC 58 and the image processing unit 60 are connected to the CPU 52, the external memory I/F unit 54, etc., via the internal bus 51.

The CPU 52 executes various arithmetic processing, and controls all settings of the system and activation of the image output DMAC 58, the compression/decompression unit 59, and image processing unit 60. The CPU 52 renders the image data in the image memory 11 via the external memory I/F unit 54 based on a printer language when receiving the image data from the host PC 300.

An operation control program for the CPU 52 is mainly stored in a ROM area of the ROM/RAM 53. The RAM area of the ROM/RAM 53 functions not only as a memory for image storage but also as a storage for storing a calculation result of the CPU 52 or as a primary storage of various data. As the storage memory, the image memory 11 is also used via the external memory I/F unit 54.

The communication system I/F unit 55 is an I/F (interface) unit between the system controller 10 and the host PC 300, the control panel 204, and the facsimile board 205 (see FIGS. 1 and 2). The transmitted and received data is communicated with the CPU 52 via the image memory 11 or internal registers.

The internal bus I/F unit 56 is an interface between the PCIe I/F unit 57 and the internal bus 51. The internal bus I/F unit 56 receives an address and data designated from a master of the PCIe bus 12 and performs input and output operation to the external memory via the external memory I/F unit 54.

The PCIe I/F unit 57 exchanges data with the PCIe bus master according to a protocol of the PCIe bus 12.

The image output DMAC 58 functions as a DMA controller at time of printing. That is, the image output DMAC 58 is started by the CPU 52. The image output DMAC 58 reads image data from an external memory in a prespecified area, performs a handshake with the PCIe I/F unit 57 as needed, and outputs image data.

The compression/decompression unit 59 is activated by the CPU 52 and is used for compressing or decompressing various data to save memory.

In addition to processing such as edge emphasis processing, the image processing unit 60 has a mechanism for correcting skew or distortion of image data.

Figure 3:
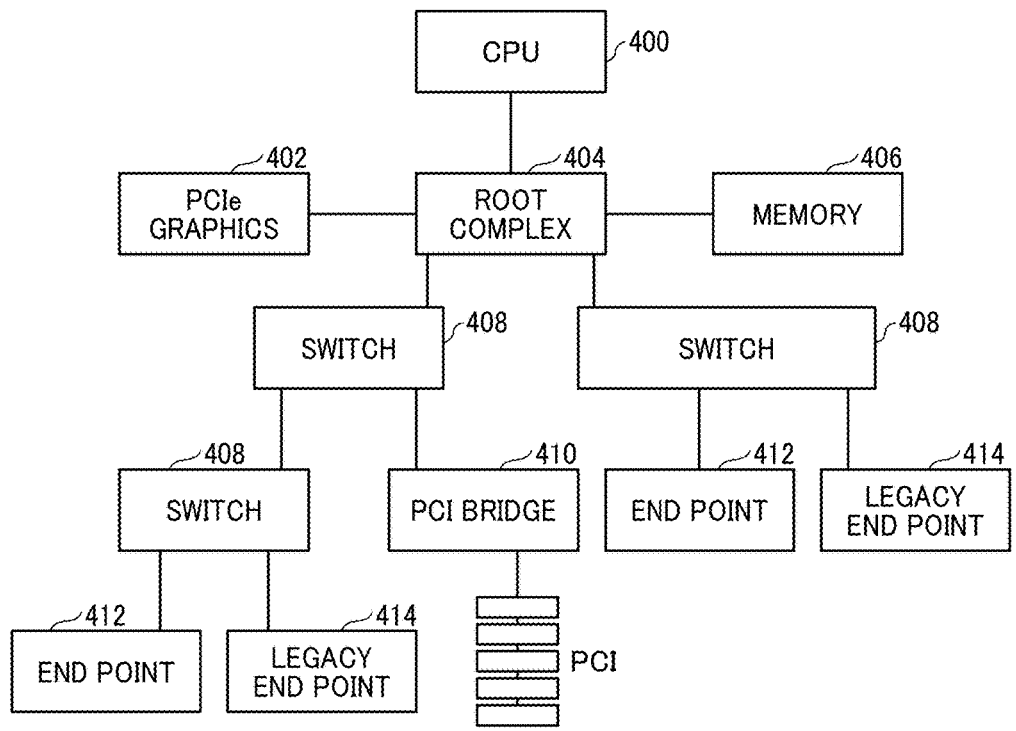
FIG. 3 is a block diagram illustrating an example of a configuration of a PCI Express system.

FIG. 3 is a block diagram illustrating an example of a configuration of a PCI Express system. As illustrated in FIG. 3, a root complex 404 connected to a CPU 400 is located at the highest level in a system I/O (input/output) hierarchy. The root complex 404 includes multiple ports of PCI Express and is connected to a memory 406. An endpoint 412 is a device located at the end of an I/O structure of PCI Express. A switch 408 is used to extend the ports of PCI Express. A PCIe graphics board 402 is, for example, a graphics board used for a PC or the like. A PCI bridge 410 is used to connect with PCI, which is a conventional bus standard. A legacy end point 414 is a device connected by PCI.

Figure 4:
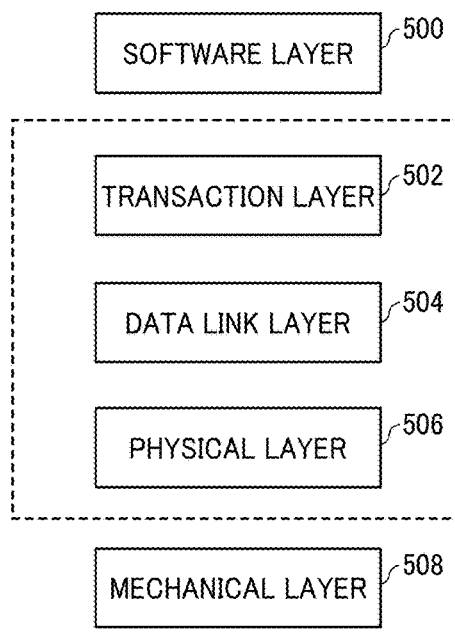
FIG. 4 is a schematic view of a hierarchical structure of PCI Express.

FIG. 4 is a schematic view of a hierarchical structure of PCI Express. As illustrated in FIG. 4, PCI Express adopts a hierarchical structure and specifications are defined for each layer. PCI Express includes a software layer 500, a transaction layer 502, a data link layer 504, a physical layer 506, and a mechanical layer 508. The transaction layer 502 specifies sending or receiving of messages and interruptions. The data link layer 504 specifies CRC (Cyclic Redundancy Check) and retry in case of error. The physical layer 506 specifies transmission and reception of packets, initialization, and configuration. The packets are the minimum transfer unit. The hierarchical structure of a PCI Express allows upgrade in each layer. For example, the physical layer 506 can be upgraded without affecting other layers such as the transaction layer 502 and the data link layer 504.

Figure 5:
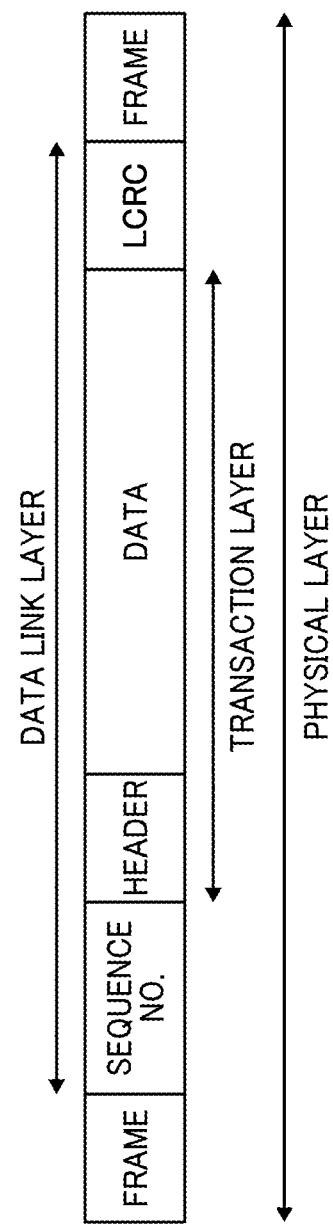
FIG. 5 illustrates a format of a transaction packet of PCI Express.

FIG. 5 illustrates a format of a transaction packet of PCI Express. PCI Express communicates in packet units. The transaction packet is divided into data link layer packets when the transaction packet is transferred from the physical layer 506 to the data link layer 504. The packets are transferred over a communication path called a lane. As illustrated in FIG. 5, the physical layer 506 corresponds to the entire format of the transaction packet. The data link layer 504 corresponds to a sequence No., a header, data, and LCRC (Link Cyclic Redundancy Check). The transaction layer 502 corresponds to the header and data.

Figure 6A:
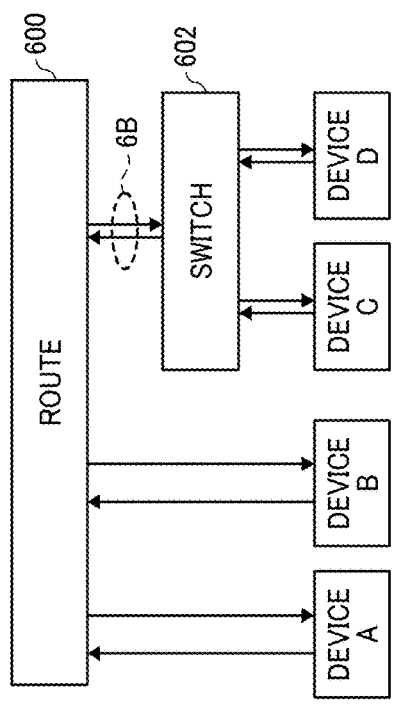
FIGS. 6A and 6B illustrate a configuration of a virtual channel of PCI Express.
Figure 6B:
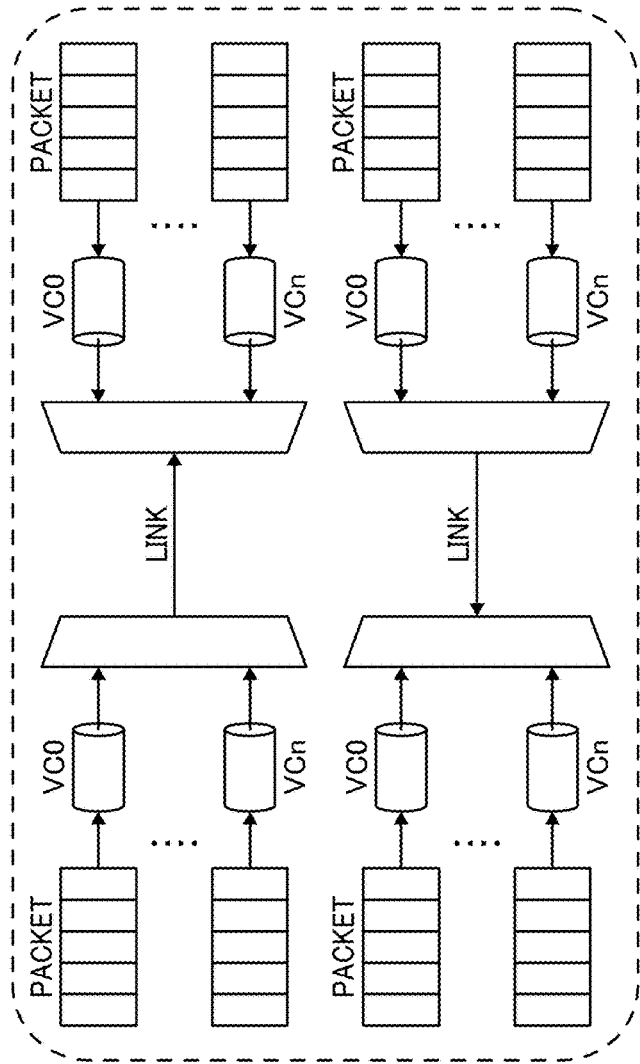

FIGS. 6A and 6B illustrate a configuration of a virtual channel of PCI Express. PCI Express uses concept of virtual channels to perform flow control of the packet. The virtual channel is a mechanism for providing traffic in different service quality. Each virtual channel has resources such as buffers or cues. Each virtual channel is controlled independently. Through this control, even if the buffer for a specific virtual channel becomes full, PCI Express can transfer the packet through another virtual channel. Thus, PCI Express can divide one physical link into multiple virtual links and use the multiple virtual links. FIG. 6B is an enlarged view of a portion surrounded by an ellipse indicated by a broken line in FIG. 6A. FIG. 6B illustrates an example in which "n" numbers of virtual channels share one link.

According to the PCI Express standard, PCI Express can possess up to eight virtual channels. Use of a single virtual channel (VC 1ch) is required, and other seven virtual channels are optional. Thus, it is necessary to determine the number of virtual channels as a system by examining the specifications of a counterpart device. However, most general-purpose SoC (System on Chip) supports only a single virtual channel (VC 1ch).

FIG. 7 is a diagram illustrating an example of a configuration of PCI Express using two virtual channels (VC 2ch). In FIG. 7, an image data transfer system is an example of implementation using two virtual channels (VC 2ch) of VC0 and VC1 in the image forming apparatus 1000. The numbers in parentheses in FIG. 7 indicate respective transfer orders. A protocol controller 700 operates VC0 and VC1 independently. The PCIe I/F unit 57 illustrated in FIG. 2 includes the protocol controller 700 of PCI Express. The protocol controller 700 includes a transfer command and data controller 702 and an IP unit 704. Generally, an IP Core (Intellectual Property Core) is used for an IP unit 704 for implementing an interface of PCI Express. In an example illustrated in FIG. 7, the protocol controller 700 assigns the read data to VC0 and assigns the write data to VC1. Thus, the transfer command and data controller 702 can independently control the read data and the write data. In this example, a command for a read data transfer is issued to VC0 (1). Upon receiving a response to the command for the read data transfer, the transfer command and data controller 702 actually starts a data transfer (transmission operation) (2). Similarly, the transfer command and data controller 702 issues a command for a write data transfer to VC1 (1). Upon receiving the response to the command for the write data transfer, the transfer command and data controller 702 receives the write data when the data is transferred from the counterpart device 706 (2). The protocol controller 700 can independently execute the commands or data transfer in each VC (VC0 and VC1).

The virtual channel used for transferring the specific packet is determined according to the traffic class (TC). Mapping between the virtual channel and the traffic class can be set by software. In other words, association between the virtual channel and the traffic class is set by the software. However, due to the hardware standards, the mapping has to be matched with mapping at the counterpart device. In the above case, the mapping assigns TC0 to VC0 and assigns TC1 to VC1 in the protocol controller 700, and so mapping of the counterpart device 706 has to be matched with the above-described mapping, that is, TC0 is assigned to VC0, and TC1 is assigned to VC1. Here, TC0 is fixedly assigned to VC0 in the specifications. Thus, the counterpart device has to support two virtual channels (VC 2ch). Thus, it is difficult to construct a system using a general-purpose SoC, which often supports only a single virtual channel (VC 1ch) as the counterpart device 706.

FIGS. 8A and 8B are flowcharts of an operation in a configuration using two virtual channels (2ch). In the two virtual channels (VC 2ch) configuration, the read data transfer and the write data transfer can be operated in parallel. A flow starting from a step S101 in FIG. 8A is the flow at time of the read data transfer. A flow starting from a step S201 in FIG. 8B is the flow at time of the write data transfer.

In a case of the read data transfer, the transfer command and data controller 702 issues a read data transfer command to the IP unit 704 (S101). Standby continues until a response of acceptance to the command is returned from the IP unit 704 (NO in S102). If the transfer command and data controller 702 receives the response of acceptance from the IP unit 704 (YES in S102), the transfer command and data controller 702 starts transferring the read data to the IP unit 704 (S103). During transferring of the read data, when the IP unit 704 cannot accept the read data (NO in S104), the transfer command and data controller 702 waits until the IP unit 704 becomes acceptable to the read data (YES in S104). A transmission operation is repeated (NO in S105) until the transmission of all the read data is completed (YES in S105). The transmission operation (data transfer) ends (S106) when the transmission of all the read data is completed (YES in S105).

In a case of the write data transfer, the transfer command and data controller 702 issues a write data transfer command to the IP unit 704 (S201). Standby continues until a response of acceptance to the command is returned from the IP unit 704 (NO in S202). When the response of acceptance is received (YES in S202), a process of the write data transfer is started (S203). In this case, the write data is transferred from the IP unit 704 to the transfer command and data controller 702. In other words, the transfer command and data controller 702 receives the write data from the IP unit 704. When effective data is returned from the IP unit 704 (YES in S204), the data is transferred to the subsequent stage. A reception operation is repeated (NO in S205) until all data is received (YES in S205). The reception operation (data reception) ends (S206) after the reception of all the write data is completed (YES in S205). The protocol controller 700 can execute two operations of reading and writing in parallel because the protocol controller 700 has a configuration using two virtual channels (VC 2ch).

FIG. 9 is a diagram illustrating an example of a configuration using a single virtual channel (VC 1ch). FIG. 9 is an example of implementation of an image data transfer system in which only a single virtual channel (1ch) is used in the image forming apparatus 1000. The numbers in parentheses in FIG. 9 indicate respective transfer orders of a command and data. The transfer order in FIG. 9 is an example, and the transfer order may be changed according to a request. Upon receiving a transfer request of the read data or the write data, the transfer command and data controller 702 issues a command. In the example illustrated in FIG. 9, the transfer command and data controller 702 first issues a command for transferring the write data (1). Upon receiving a response of accepting the write command, the transfer command and data controller 702 stands by for reception of the write data. Upon receiving the transfer request of the read data in this state, the transfer command and data controller 702 issues a read data transfer command (2). When the transfer command and data controller 702 receives a response to the read command, the transfer command and data controller 702 transmits the read data (3) to the IP unit 704. When the write data is returned from the transfer command and data controller 702 to the IP unit 704, the IP unit receives the write data and outputs the write data to the subsequent stage (4).

In order to enable the above operation, the transfer command and data controller 702 arbitrates the transfer request of the read data and the transfer request of the write data. Further, the transfer command and data controller 702 shares a command line with the IP unit 704. The transfer command and data controller 702 includes separate data lines for transmission or reception of the data and command. Thus, the data transfer is possible even when the write data is received during transmission of the read data. Since VC0 is always supported according to PCI Express standard, a system is established regardless of the counterpart device in this configuration. Thus, the present embodiment enables a configuration in which a configuration using multiple virtual channels as illustrated in FIG. 7 and a configuration using a single virtual channel as illustrated in FIG. 9 coexist and are switchable.

Figure 10:
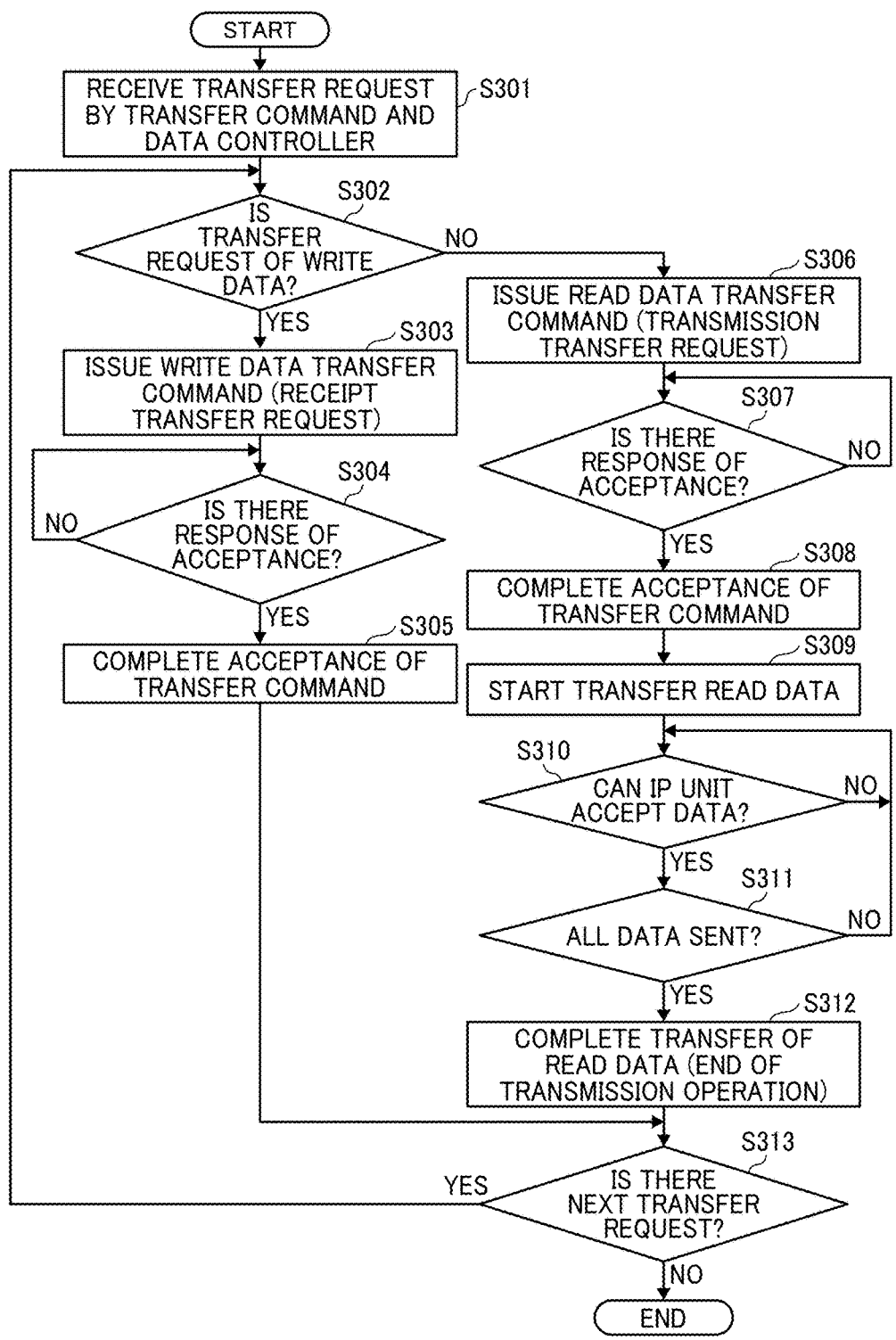
FIG. 10 is a flowchart of an operation in a configuration using a single virtual channel (VC 1ch) in FIG. 9.

FIG. 10 is a flowchart of an operation in a configuration of a single virtual channel (1ch) in FIG. 9. In step S301, when the transfer command and data controller 702 receives the transfer request, the transfer command and data controller 702 determines whether the transfer request is the read data transfer request (NO in S302) or the write data transfer request (YES in S302). Then, the transfer command and data controller 702 issues the transfer command according to the transfer request. If the transfer request is for the write data transfer, the transfer command and data controller 702 issues the write data transfer command (receipt transfer request) (S303). If the transfer request is for the read data transfer, the transfer command and data controller 702 issues the read data transfer command (transmission transfer request) (S306). Since the transfer command and data controller 702 has a configuration of only a single virtual channel (VC 1ch) as illustrated in FIG. 9, any command is output to VC0. After issuing the transfer command of the write data (receipt transfer request) (S303), the transfer command and data controller 702 waits for the response of acceptance of the transfer command of the write data from the IP unit 704 (NO in S304). When the transfer command and data controller 702 receive the response of acceptance of the transfer command of the write data from the IP unit 704 (YES in S304) and complete the acceptance of the transfer command of the write data (S305), the transfer command and data controller 702 becomes a state of ready to issue the next command (S313). The response to the issued transfer command is returned to the IP unit 704 after a latency period of the counterpart device 706. Since the path for receiving the write data exists independently from the path for receiving the read data, the transfer command and data controller 702 can shift to a next operation after the IP unit 704 accepts the command.

After issuing the transfer command of the read data (transmission transfer request) (S306), the transfer command and data controller 702 waits for the response of acceptance of the transfer command of the read data from the IP unit 704 (NO in S307). In step S306, the transfer command and data controller 702 issues a read data transfer command to the IP unit 704 as similar to the configuration using two virtual channels (VC 2ch) after receiving the read data transfer command. Here, processes from steps S306 to S307 in FIG. 10 are identical to the processes from steps S101 to S102 in FIG. 8. After a completion of acceptance of the transfer command by the IP unit 704 (S308), the processes from steps S309 through S312 are executed. The processes from steps S309 through S312 in FIG. 10 are identical to the processes from steps S103 through S106 in FIG. 8. Upon completion of the transmission transfer, the transfer command and data controller 702 can issue a command of the next transfer request (YES in S313).

FIG. 11 is a diagram illustrating an example of a register for setting the virtual channel according to the embodiment of the present disclosure. The virtual channel supported by the PCIe I/F unit 57 (see FIG. 2) can be set by a register illustrated in FIG. 11 by software. The IP unit 704 of the protocol controller 700 included in the PCIe IF unit 57 has a number of registers illustrated in FIG. 11 as many as a number of virtual channels to be supported. In an example illustrated in FIG. 11, whether to set the virtual channel to be enable or disable is set by "vc_enable" corresponding to the ADDRESS 31 in the register. The "vc_enable" is readable and writable. Further, the address of "vc_id", which is read only (RO), corresponding to the ADDRESS 16 through 18 of the register is an ID for identifying the virtual channel (VC). Depending on the ID, any one of VC0 through VC8 is set as the virtual channel. In addition, mapping of VC and TC is performed with readable and writable "vc_tc_map" corresponding to ADDRESS 07 through 00 of the register. The mapping needs to be matched with the mapping of the counterpart device 706.

For example, when 8'b0000_0001 is set for "vc_tc_map" of the register of VC0, TC0 is mapped to VC0. TC0 is fixedly associated with VC0 according to PCI Express standard. When "vc_tc_map" of the register of VC0 is set to 8'b0000_0011, multiple TC of TC0 and TC1 are mapped to VC0. Similarly, if 8'b0000_0010 is set to "vc_tc_map" of the register of VC1, TC1 is mapped to VC1. However, it is not possible to map one TC to multiple virtual channels (VC) according to the standard.

Figure 12:
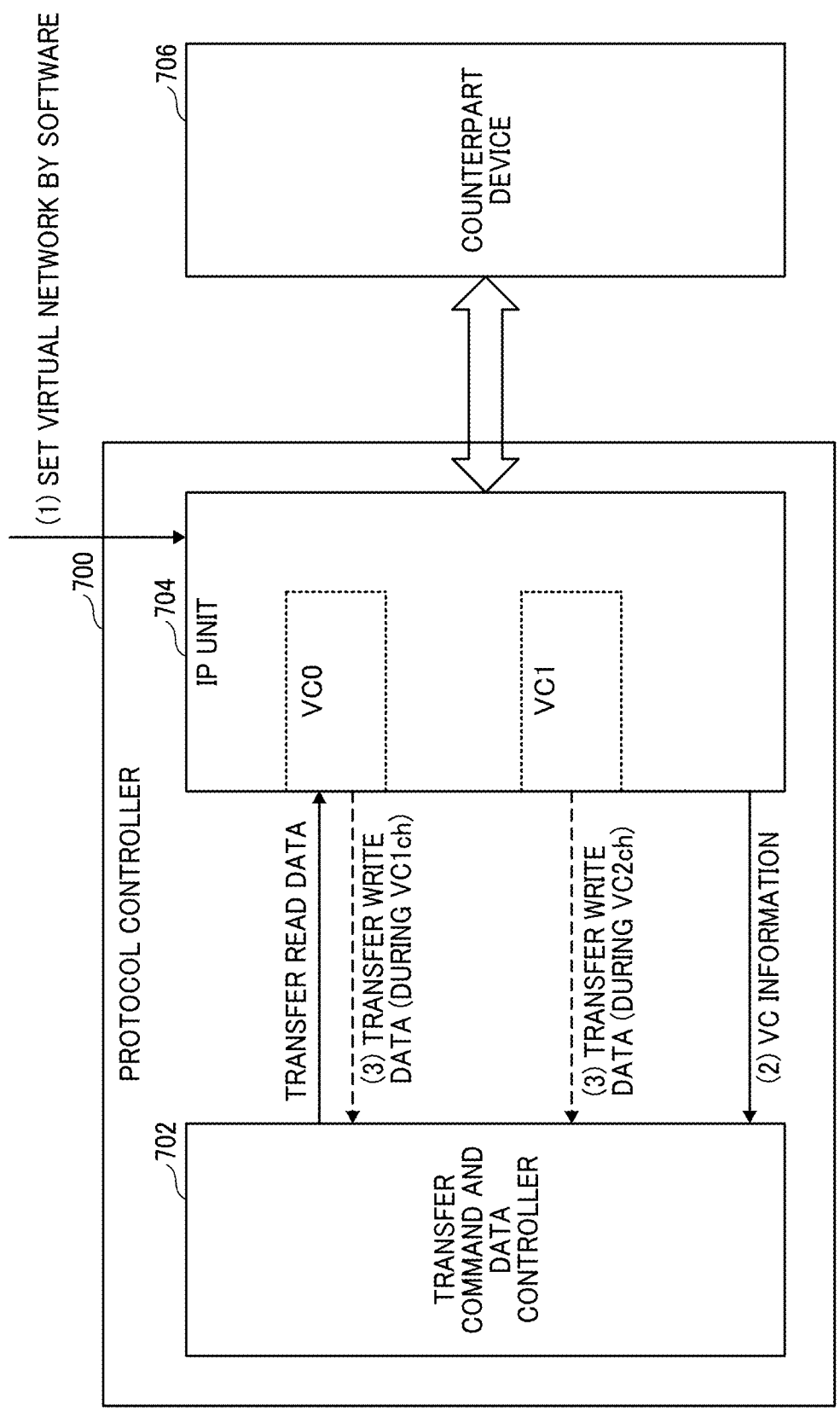
FIG. 12 is a diagram illustrating an example of a configuration of PCI Express using two virtual channels (VC 2ch)

FIG. 12 is a diagram illustrating an example of a configuration of PCI Express using two virtual channels (VC 2ch). FIG. 12 illustrates a transfer switching operation by setting the virtual channel. When the VC and the TC are set in the registers shown in FIG. 11 by the software, the protocol controller 700 included in the PCIe I/F unit 57 switches the virtual channel of the transfer destination based on that setting. The transfer command and data controller 702 receives the VC information related to the setting from the IP unit 704 and determines the virtual channel (VC) to which the transfer command is to be transmitted. In the transfer switching operation according to the VC information illustrated in FIG. 12, the transfer of the read data is executed at VC0 in both the two virtual channels (VC 2ch) configuration and the single virtual channel (VC 1ch) configuration. Conversely, the write data transfer is performed by VC1 in the two virtual channels (VC 2ch) configuration and by VC0 in the VC 1ch configuration. In this way, the transfer command and data controller 702 can change the address, to which the command is issued, and switch the virtual channel (VC) used for transferring the command using the VC information set in the register as illustrated in FIG. 11.

Figure 13:
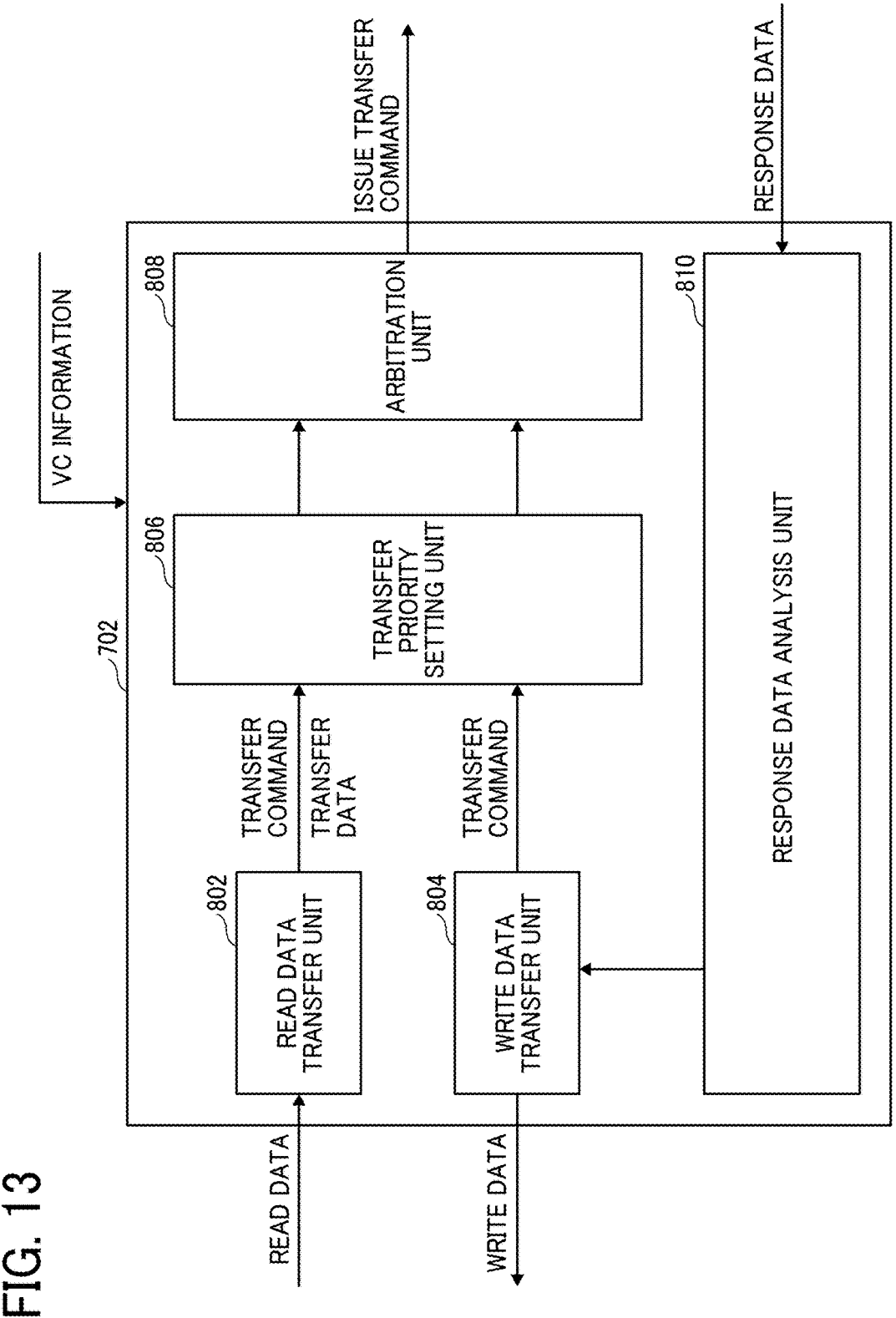
FIG. 13 is a diagram illustrating an example of a transfer command and a data controller having a configuration using a single virtual channel (VC 1ch) in the present embodiment.

FIG. 13 is a diagram illustrating an example of the transfer command and data controller 702 having a configuration using a single virtual channel (VC 1ch) in the present embodiment. The transfer command and data controller 702 includes an arbitration unit 808, a transfer priority setting unit 806, a read data transfer unit 802, a write data transfer unit 804, and a response data analysis unit 810.

FIG. 13 illustrates an operation when only a single virtual channel (VC 1ch) is set. Whether VC is 1ch or not is determined from the VC information received from the IP unit 704. The VC information is transmitted to each child module in the transfer command and data controller 800. The child module includes the arbitration unit 808, the transfer priority setting unit 806, the read data transfer unit 802, the write data transfer unit 804, and the response data analysis unit 810. When there is only a single virtual channel (VC 1ch), the same path has to be used to issue a command of read data (transmission data) and write data (reception data). When there is the transfer request of the read data or the write data, the read data transfer unit 802 and the write data transfer unit 804 respectively transmits the transfer command. The transfer priority setting unit 806 adds priority information of the transfer command to the sent transfer command. For example, the transfer priority setting unit 806 adds priority information such as priority of reading of write data to the transfer command, and outputs the transfer command to the arbitration unit 808. The arbitration unit 808 refers to the priority information on the transfer priority of the received transfer command and issues the transfer command of the write data.

When the transfer command is writing of the read data, the arbitration unit 808 transmits the data following the transfer command. When the transfer command is a transfer request for reading of the write data, the transfer command and data controller 702 receives the response data from the counterpart device 706 with a latency delay of the counterpart device 706 after the arbitration unit 808 issues the read transfer command. The response data is input to the write data transfer unit 804 via the response data analysis unit 810.

When the transfer command and data controller 702 requests data to the counterpart device 706 and when the transfer command and data controller 702 issues second request before the response data for the first request is returned from the counterpart device 706, the response data analysis unit 810 has to analyze and identify which response data corresponds to which request. When the transfer command and data controller 702 requests data to the counterpart device 706 and when multiple read requests are issued from different initiators (masters), the response data analysis unit 810 also has to analyze and identify which response data corresponds to which read request. The response data analysis unit 810 functions to perform the above described analysis. The response data analysis unit 810 manages information called a tag added at the time of issue of the transfer command to identify the response data. The priority set by the transfer priority setting unit 806 can also be changed by the register as illustrated in FIG. 14.

Figure 14:
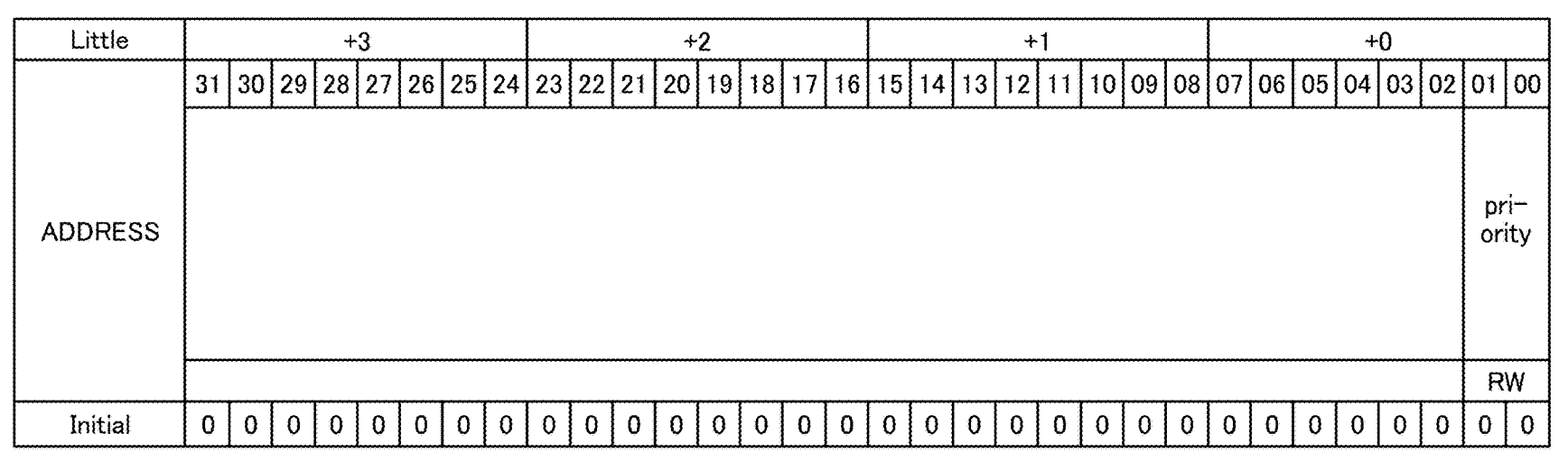

FIG. 14 is a diagram illustrating an example of a register for setting the transfer priority setting unit 806 according to the embodiment of the present disclosure. In the example illustrated in FIG. 14, the priority to be added to the transfer command by the transfer priority setting unit 806 is set at an address of "priority" corresponding to ADDRESS 00 and 01 of the register. The address of the "priority" is readable and writable (RW). For example, ADDRESS 00 and 01 of the register may be set as follows. 2'b00: Priority is assigned to the read operation of the write data. 2'b 01: Priority is assigned to the write operation of the read data. 2'b 10: Equalize the priority of write data and read data.

Referring back to FIG. 13. As described above, competing data can be arbitrated when transferring plural types of data with a single virtual channel. Since priority can be assigned to each data, it is possible to arbitrate data according to required transfer performance. Thus, efficient transfer is achieved by making the priority changeable.

Thus, the transfer priority setting unit 806 can analyze and identify which response data corresponds to which request command when the request command of the receipt transfer is issued from plurality of initiators (masters) or when the transfer command and data controller 702 issues second request command before the response data for the first request is returned from the counterpart device 706.

FIG. 15 illustrates an example of a reception command buffer of the counterpart device 706 in the embodiment of the present disclosure. As illustrated in FIG. 15, the issued command is received and accumulated in a command buffer of the counterpart device 706. FIG. 15 illustrates a state in which the counterpart device 706 receives a read command RD_CMD (reception transfer command) while a write command WR_CMD (transmission transfer command) remains in the command buffer in the counterpart device 706. The command output from the protocol controller 700 may be remained in the counterpart device 706 side as described above. In a situation in which the write command WR_CMD is remained in the counterpart device 706, even if the counterpart device 706 receives the read command RD_CMD, the counterpart device 706 does not output the read command RD_CMD from the buffer until the counterpart devices 706 completes processing of the write command WR_CMD. In this case, even if the transfer priority setting unit 806 assigns priorities and arbitrates, the response data may not be easily returned from the counterpart device 706 to the transfer command and data controller 702. Thus, the transfer performance may be adversely affected.

Thus, the protocol controller 700 has a function of not issuing the next write command WR_CMD for a designated time after the protocol controller 700 issues the write command WR_CMD once. This function of the protocol controller 700 prevents the original transfer priority (contributing to transfer performance) from being affected by a continuation of only one of the write command WR_CMD or the read command RD_CMD in an extremely biased manner. There may be a case in which the read command RD_CMD is output consecutively depending on a situation. However, the protocol controller 700 has the function that can control the interval of issuing the command in the write command WR_CMD side.

Thus, the protocol controller 700 can balance the write command WR_CMD and the read command RD_CMD by adjusting the interval. Thus, the protocol controller 700 can prevent only the write commands WR_CMD (transmission transfer command) from remaining in the command buffer of the counterpart device 706. Thus, the protocol controller 700 can prevent the remaining command from affecting the reception transfer. Latency easily occurs in the reception transfer during receiving the transfer request. A switching of enable and disable of the function and an interval of issuance of the next command can be designated by setting values in the register having the same configuration as in FIGS. 11, 16, and 17.

FIG. 16 is a diagram illustrating an example of a register for enabling or disabling a function of adjusting an interval of the write command WR_CMD in the embodiment of the present disclosure. As illustrated in FIG. 16, whether to enable or disable the function of adjusting the interval of WR_CMD is set by "wr_cmd_ctl" corresponding to ADDRESS 00 of the register. The "wr_cmd_ctl" is readable and writable.

Figure 17:
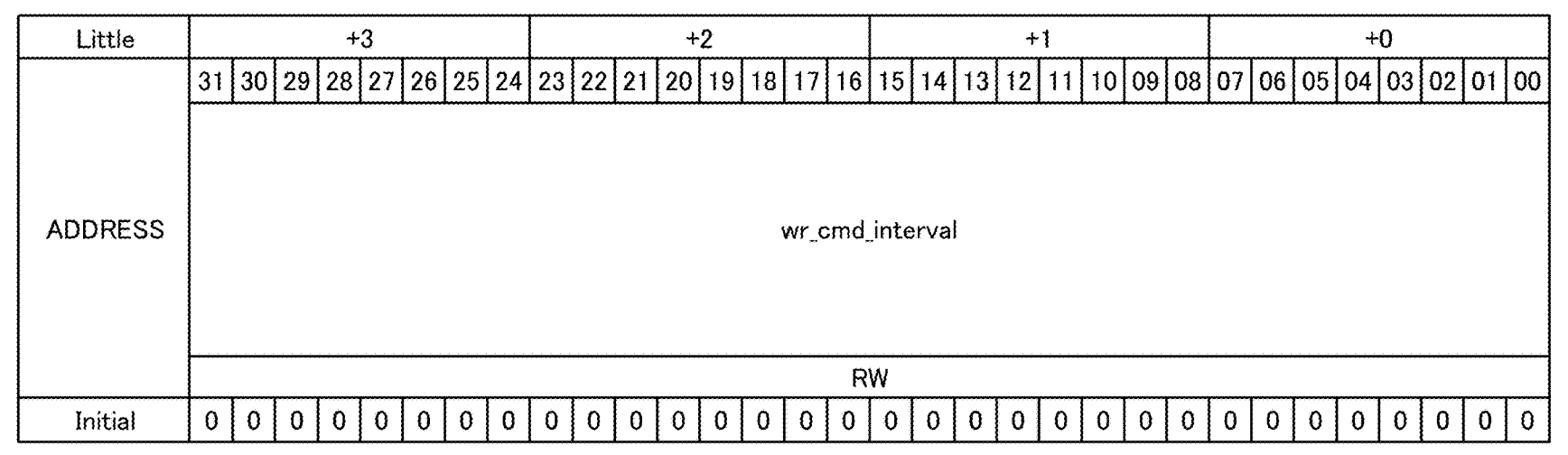

FIG. 17 illustrates an example of a register for designating an interval of the write command WR_CMD according to the embodiment of the present disclosure. As illustrated in FIG. 17, the interval of the write command WR_CMD is set by "wr_cmd_interval" corresponding to ADDRESS 00 through 31 in the register. The "wr_cmd_interval" is readable and writable. When "wr_cmd_ctl" illustrated in FIG. 16 is set valid, the interval of the write command WR_CMD set to "wr_cmd_interval" becomes valid.

Referring back to FIG. 13. FIG. 13 illustrates the configuration having only a single virtual channel (VC 1ch). If establishing a system of two virtual channel (VC 2ch) configuration between the protocol controller 700 and the counterpart device 706, the functions of the arbitration unit 808 and the transfer priority setting unit 806 are turned off to perform the transfer process. With the function described above, the PCIe I/F unit 57 can implement a hardware capable of changing the configuration of the virtual channel (VC) according to the specification of the counterpart device 706.

This function also enables connection with a general-purpose SoC that supports only a single virtual channel (VC 1ch). Thus, the system can be constructed without dedicated counterpart LSI circuits (Large-scale integrated circuits) in the counterpart device 706. Enabling the connection between the protocol controller 700 and a general-purpose SoC can narrow down specification of the system of the protocol controller 700 to specific functions and can construct an inexpensive system or can take special measures.

Figure 18:
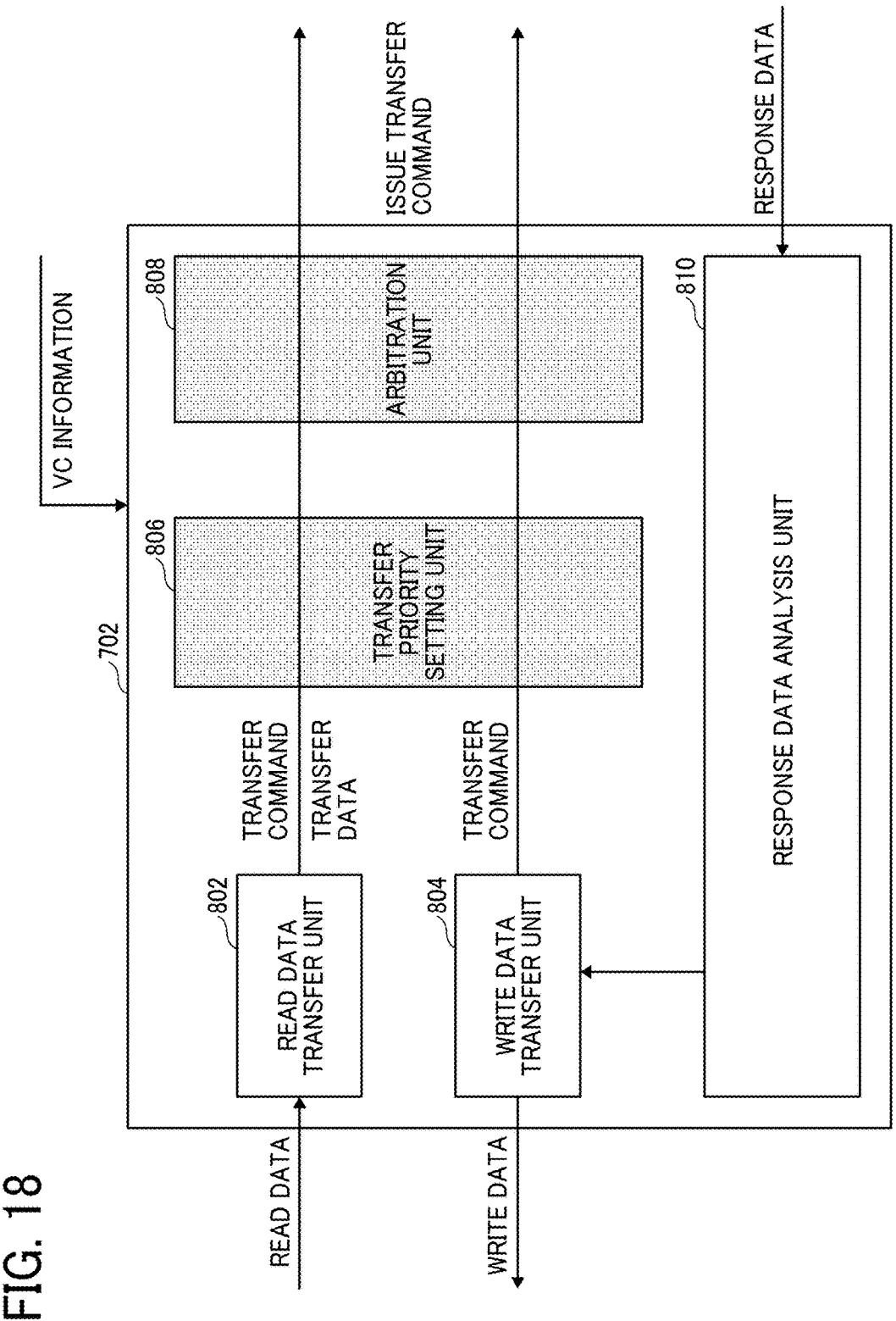
FIG. 18 is a diagram illustrating an example of a transfer command and data controller having a configuration using two virtual channels (VC 2ch) in the present embodiment.

FIG. 18 is a diagram illustrating an example of the transfer command and data controller 702 having a configuration using two virtual channels (VC 2ch) in the present embodiment. FIG. 16 illustrates an image of an operation when there are two virtual channels (VC 2ch). The transfer command and data controller 702 determines whether the counterpart device 706 includes two virtual channels (VC 2ch) according to the VC information received from the IP unit 704 as similar to the determination process in the single virtual channel (VC 1ch) as illustrated in FIG. 13.

As illustrated in FIG. 18, in the two virtual channels (VC 2ch) configuration, the transfer command or the transfer data passes through the transfer priority setting unit 806 and the arbitration unit 808 and is transmitted to the counterpart device 706. In FIG. 18, the transfer priority setting unit 806 and the arbitration unit 808 are grayed out.

Figure 19:
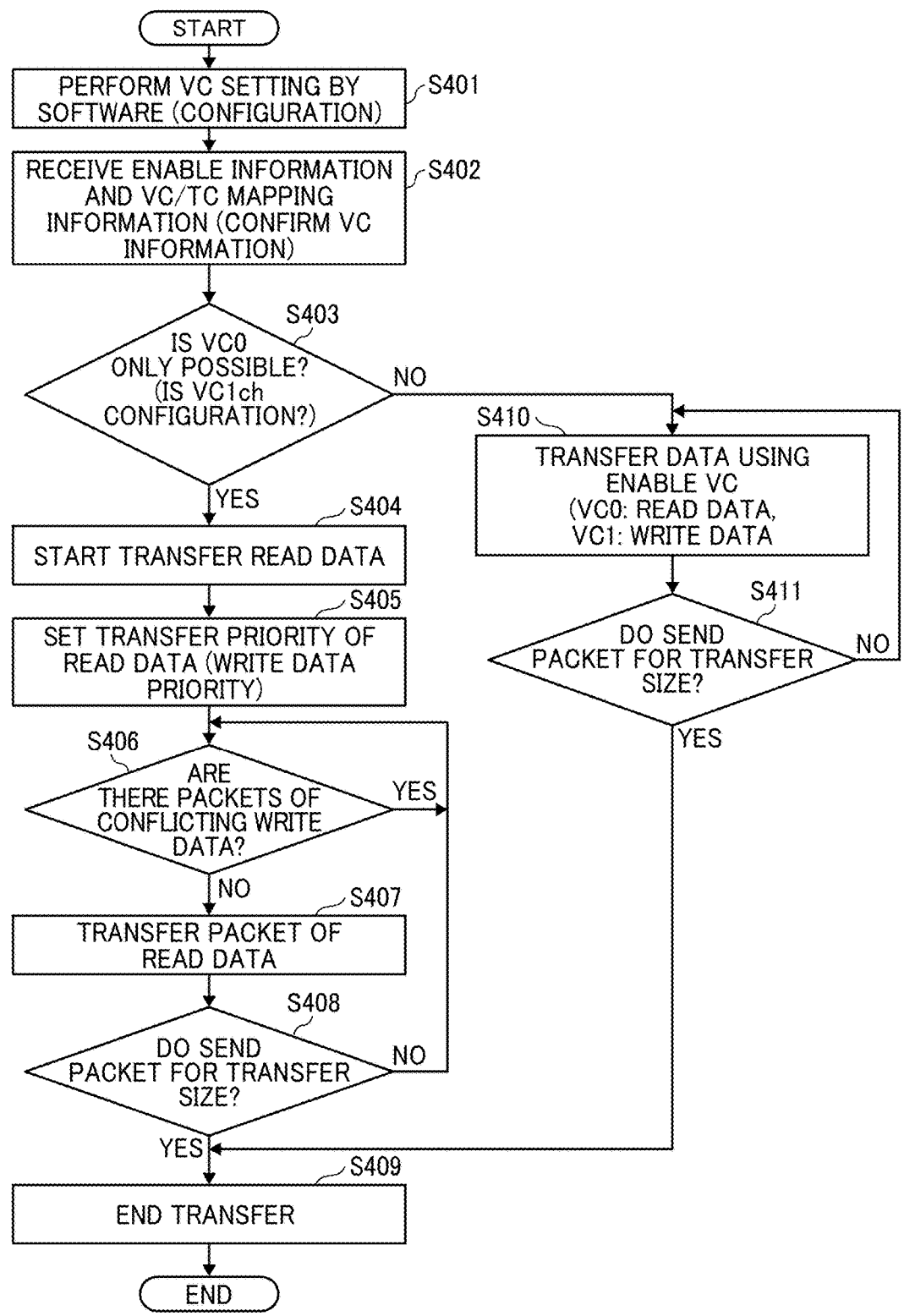
FIG. 19 is a flowchart of an operation of switching the virtual channels according to the embodiment of the present disclosure.

Thus, the transfer command and data controller 702 issues the read transfer command using the single virtual channel (VC0), and the transfer command and data controller 702 issues the write transfer command using a virtual channel (VC1) different from the single virtual channel (VC0) (see FIG. 18 and a step S410 in FIG. 19).

The transfer priority setting unit 806 and the arbitration unit 808 function at the time of the single virtual channel (VC 1ch).

FIG. 19 is a flowchart of an operation of switching the virtual channels according to the embodiment of the present disclosure. In step S401, the software sets the virtual channel (VC) to the register as illustrated in FIGS. 11 and 12. The setting in the step S401 determines an enablement and a TC mapping of each virtual channels (VC). The transfer command and data controller 702 receives the information of the setting in the step S401, that is, the VC information (S402). The VC/TC mapping of the protocol controller 700 has to match the setting of the counterpart device 706.

Here, when multiple virtual channels (VC 2ch) are enabled (NO in S403), the transfer command and data controller 702 executes data transfer by setting the read data to VC0 and setting the write data to VC1 (S410). The transfer command and data controller 702 transfers packets corresponding to a transfer size (S411), thereby completing the transfer process.

Conversely, if only single virtual channel (VC 1ch) is enabled (YES in S403), the process continues to step S404 to start the transfer process of read data. Following describes a case in which the write data has a higher priority than the read data. The transfer priority setting unit 806 sets the transfer priority of the write data to be lower than the transfer priority of the read data (S405). If there are packets of the write data to be transferred upon receiving the read command (YES in S406), the arbitration unit 808 waits for transmission of the packets of the read data until the transfer of the packets of the write data is completed. Thus, the arbitration unit 808 transmits a packet of read data (S407) when transfer of write data is not being executed (NO in S406). Again, when there is a conflict between the write data and the read data on a bus occurs, the arbitration unit 808 performs arbitration on a packet basis. This arbitration operation is repeated until a packet of the transfer size is transferred (NO in S408). After the packet of the transfer size is transferred (YES in S408), the transfer process ends (S409).

The flowchart in FIG. 19 illustrates the configurations of single virtual channel (VC 1ch) and two virtual channels (VC 2ch). However, the present embodiment is also applicable to a configuration with more than two virtual channels (VC 2ch). For example, the virtual channels may be combinations of single virtual channel (VC 1ch) and four virtual channels (VC 4ch) or the like. In a case of the four virtual channels (VC 4ch), the data transfer may be performed by transferring the read data using VC0 and VC1 and transferring the write data using VC2 and VC3.

As described above, the embodiments of the present disclosure sets enable or disable of the virtual channels to enable a variable number of the virtual channels. Thus, it is possible to establish communication with the counterpart device 706. Thus, the present embodiment can enable the data transfer in both cases in which the number of the virtual channels of the serial interface of the counterpart device 706 is single or multiple.

In the embodiments of the present disclosure, the image forming apparatus 1000 is one of an example of a data transfer apparatus. The counterpart device 706 is an example of a transfer destination device. The IP unit 704 is an example of a setting unit. The protocol controller 700 is an example of a first communication unit or a second communication unit. The transfer command and data controller 702 is an example of the issuing unit. The read command WR_CMD is an example of a write transfer command. The write command RD_CMD is an example of a read transfer command.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above. The methods described above can be provided as program codes stored in a recording medium, to cause a processor to execute the method when executed by at least one processor. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

A non-transitory recording medium such as ROM 53 stores instructions which, when executed by one or more processors such as CPU 52, cause the processors to perform the method as described in the present disclosure.

Numerous additional modifications and variations are possible in light of the above teachings. Such modifications and variations are not to be regarded as a departure from the scope of the present disclosure and appended claims, and all such modifications are intended to be included within the scope of the present disclosure and appended claims.

What is claimed is:

1. A data transfer device, comprising:
   circuitry to:
   set information regarding a virtual channel of a counterpart device to which data are to be transferred from the data transfer device;
   switch between a first communication process and a second communication process according to the information regarding the virtual channel of the counterpart device,
   the first communication process causing the circuitry to transmit or receive the data using a single virtual channel, and
   the second communication process causing the circuitry to transmit or receive the data using multiple virtual channels, each virtual channel of the multiple virtual channels being assigned a priority based on data items communicated therethrough.

2. The data transfer device according to claim 1, wherein the data includes a plurality of data items, and, in the first communication process, the circuitry assigns a priority to each data item and determines an order of transferring the data items according to the priorities.

3. The data transfer device according to claim 1, wherein the circuitry further:
   issues a read transfer command or a write transfer command,
   the read transfer command causing transmission of the data using the first communication process or the second communication process,
   the write transfer command causing reception of the data using the first communication process or the second communication process;
   when the write transfer command includes a plurality of write transfer commands, analyzes a plurality of data items received as a response to the write transfer commands; and
   determines which one of the plurality of data items received as a response to the write transfer commands corresponds to which one of the write transfer commands.

4. The data transfer device according to claim 3, wherein the circuitry controls issuance of the write transfer command.

5. The data transfer device according to claim 4, wherein the circuitry sets a time interval from issuance of a first write transfer command to issuance of a second write transfer command.

6. The data transfer device according to claim 3, wherein the circuitry further:
   issues the read transfer command to the single virtual channel in the first communication process; and
   issues the write transfer command using a virtual channel different from the single virtual channel.

7. The data transfer device according to claim 1, wherein the counterpart device is a system on a chip (SOC) device.

8. The data transfer device according to claim 1, wherein the first and second communication processes are performed in accordance with Peripheral Component Interconnect Express (PCI Express).

9. A data transfer method for transferring data using a serial interface, the data transfer method comprising;
   setting information regarding a virtual channel of a counterpart device to which data are to be transferred;

switching between a first communication process and a second communication process according to the information regarding the virtual channel of the counterpart device, the first communication process causing the circuitry to transmit or receive the data using a single virtual channel, and the second communication process causing the circuitry to transmit or receive the data using multiple virtual channels, each virtual channel of the multiple virtual channels being assigned a priority based on data items communicated therethrough.

10. A non-transitory recording medium storing instructions which, when executed by one or more processors, cause the one or more processors to execute a data transfer method comprising:

setting information regarding a virtual channel of a counterpart device to which data are to be transferred;

switching between a first communication process and a second communication process according to the information regarding the virtual channel of the counterpart device, the first communication process causing the circuitry to transmit or receive the data using a single virtual channel, and the second communication process causing the circuitry to transmit or receive the data using multiple virtual channels, each virtual channel of the multiple virtual channels being assigned a priority based on data items communicated therethrough.

* * * * *